United States Patent
Aschenbrenner et al.

(10) Patent No.: US 7,218,405 B1
(45) Date of Patent: May 15, 2007

(54) METHOD, DATA STRUCTURE AND APPARATUS FOR PROVIDING OBJECT LEVEL RENDERING CONTROL USING TAGGED SECONDARY RESOURCES

(75) Inventors: Jean Margaret Aschenbrenner, Boulder, CO (US); Reinhard Heinrich Hohensee, Boulder, CO (US); Dwight Ross Palmer, Longmont, CO (US); Nenad Rijavec, Longmont, CO (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/507,022

(22) Filed: Feb. 18, 2000

(51) Int. Cl.
*G06F 15/00* (2006.01)
*G06K 15/00* (2006.01)

(52) U.S. Cl. .................. 358/1.15; 358/1.2; 715/517

(58) Field of Classification Search .............. 358/1.15, 358/1.9, 323, 1.13, 1.1, 1.11–1.14, 1.16–1.18, 358/1.2; 345/589, 431, 581; 715/513, 515, 715/517
See application file for complete search history.

(56) References Cited

U.S. PATENT DOCUMENTS

| | | | | |
|---|---|---|---|---|
| 5,704,021 A * | 12/1997 | Smith et al. | .................. | 358/1.9 |
| 5,727,220 A * | 3/1998 | Hohensee et al. | .......... | 715/513 |
| 5,813,020 A * | 9/1998 | Hohensee et al. | .......... | 715/515 |
| 5,835,098 A * | 11/1998 | Lipton | ...................... | 345/589 |
| 5,872,895 A * | 2/1999 | Zandee et al. | ................ | 358/1.9 |
| 5,966,462 A | 10/1999 | Linder et al. | | |

\* cited by examiner

*Primary Examiner*—David Moore
*Assistant Examiner*—Thierry L. Pham
(74) *Attorney, Agent, or Firm*—David W. Lynch; Chambliss, Bahner & Stophel PC

(57) ABSTRACT

The present invention allows data objects to be tagged with secondary resources that specify rendering attributes, such as color profiles. A method, data structure and apparatus provides object level management using tagged secondary resources. Rendering control (color space selection, in this case) of the primary datastream (AFP, in this case) is provided to heterogeneous objects (PostScript Level 1 color images, in this case). The present invention provides a method for the primary datastream to include the source calibration parameters, i.e., the rendering control, without modifying the heterogeneous object. For example, if the threshold matrix for the halftoning is tagged as a resource to the image object, the rendering process can use this specific matrix when the image is halftoned and presented.

47 Claims, 5 Drawing Sheets

```
MDR
 320 ┌── FQN 'DE' <CMYK SWOP OID=X'06072B120004030300'>        ⎫
 330 ┌── Triplet X'10' <color profile type OID = X'06072B1200040 10f 2D'>  ⎬ ENVIRONMENTAL
                                                               ⎭ GROUP, e.g., AEG IOB, <ObjType = Other object data>
 370 ┌── FQN '01' <name of EPS object, overrides 8-byte token name in IOB>  ⎫
 380 ┌── X'10' triplet <object type OID = EPS object>          ⎬ PAGE DATA
 360 ┌── FQN 'DE' <CMYK SWOP OID=X'06072B120004030300'>        ⎭
```

Fig. M

METHOD, DATA STRUCTURE AND APPARATUS FOR PROVIDING OBJECT LEVEL RENDERING CONTROL USING TAGGED SECONDARY RESOURCES

BACKGROUND OF THE INVENTION

1. Field of the Invention

This invention relates in general to printing systems, and more particularly to a method, data structure and apparatus for providing object level rendering control using tagged secondary resources.

2. Description of Related Art

Documents use images, graphics and selected fonts to present their message more clearly. A printer file defines how application program output is mapped to each page and then printed. Rendering is the process a printer uses to translate the commands of a printer file to create an image. While the printer commands describe what the final page should look like, many do not describe how each object should be rendered. This extra rendering control consists of such calibration parameters as color correction points and halftone cell data.

Some printer command languages provide rendering controls that apply to all subsequent drawing commands. No existing printer command language provides rendering control for each object on a page. Many languages have no rendering control whatsoever. However, the need for rendering control continues to increase.

For example, as the use of color input, display and output devices increase, so does the need for color management to ensure document colors appear the same in all devices. This is due to several factors. For example, differing device types operate in different color spaces. A color space is a model for representing color in terms of intensity values; a color space specifies how color information is represented. A color space defines a one-, two-, three-, or four-dimensional space whose dimensions, or components, represent intensity values. A color component is also referred to as a color channel. For example, RGB space is a three-dimensional color space whose components are the red, green, and blue intensities that make up a given color. For example, color monitors display colors as combinations of red, green and blue, and are said to work in the RGB color space, Printers, however, generally print images as combinations of cyan, magenta, yellow and black, and are said to work in the CMYK color space.

Different color devices have different color capabilities. Every color device, such as a scanner, printer or monitor, has a range of colors that it can produce, which is often referred to as a gamut.

In addition, devices of the same type that are manufactured by different manufacturers may produce different colors for the same object. Also, the gamut that an ink jet color printer can print may be quite different from a printer based on a different technology such as a color laser printer.

Some color spaces can express color in a device-independent way. Whereas RGB colors vary with display and scanner characteristics, and CMYK colors vary with printer, ink, and paper characteristics, device-independent colors are meant to be true representations of colors as perceived by the human eye. These color representations, called device-independent color spaces, result from work carried out in 1931 by the Commission Internationale d'Eclairage (CIE) and for that reason are also called CIE-based color spaces.

The most common method of identifying color within a color space is a three-dimensional geometry. The three color attributes, hue, saturation, and brightness, are measured, assigned numeric values, and plotted within the color space. RGB colors vary with display characteristics, and CMYK colors vary with printer, ink, and paper characteristics. Conversion from an RGB color space to a CMYK color space involves a number of variables. The type of printer or printing press, the paper stock, and the inks used all influence the balance between cyan, magenta, yellow, and black. In addition, different devices have different gamuts, or ranges of colors that they can produce. Because the colors produced by RGB and CMYK specifications vary from device to device, they're called device-dependent color spaces. Device-dependent color spaces enable the specification of color values that are directly related to their representation on a particular device.

Device-independent color spaces, or interchange color spaces, are used to convert color data from the native color space of one device to the native color space of another device. The CIE created a set of color spaces that specify color in terms of human perception. It then developed algorithms to derive three imaginary primary constituents of color—X, Y, and Z—that can be combined at different levels to produce all the color the human eye can perceive. The resulting color model, CIE X, Y, Z and other CIE color models form the basis for all color management systems. Colors can be specified in the CIE-based color spaces in a way that is independent of the characteristics of any particular display or reproduction device. The goal of color management is for a given CIE-based color specification to produce consistent results on different devices, up to the limitations of each device.

CIELuv is a CIE-based color space used in additive color systems, including color lights and emissive phosphor displays. CIELab is a CIE-based color space that is often used as a device-independent color space in printing applications.

Color matching typically means converting colors between differing gamuts. Most current color management systems match colors pursuant to a rendering intent. Objects are anything that can be drawn, and include text, graphics, and raster images. Usually, a document containing objects is printed using a rendering intent for the whole document. Some printers have been equipped with a console control to control the rendering for each job. Yet, a control console will not allow a page containing different types of objects to have each of the objects rendered individually.

Print systems include presentation architectures, which are provided for representing documents in a data format that is independent of the methods utilized to capture or create those documents. One example of an exemplary presentation system, which will be described herein, is the AFP™ (Advanced Function Presentation) system developed by International Business Machines Corporation. However, those skilled in the art will recognize that the present invention is not meant to be limited to the AFP™ system, but rather the AFP™ system is presented herein as merely one example of a presentation system applicable to the principles of the present invention.

According to the AFP™ system, documents may contain combinations of text, image, graphics, and/or bar code objects in device and resolution independent formats. Documents may also contain and/or reference fonts, overlays, and other resource objects, which are required at presentation time to present the data properly. Additionally, documents may also contain resource objects, such as a document index and tagging elements supporting the search and navigation of document data for a variety of application purposes. In general, a presentation architecture for presenting documents in printed format employs a presentation datastream. To increase flexibility, this stream can be further divided into a device-independent application datastream and a device-dependent printer datastream.

A datastream is a continuous ordered stream of data elements and objects that conform to a given formal definition. Application programs can generate datastreams destined for a presentation device, archive library, or another application program. The Mixed Object Document Content Architecture (MO:DCA)™ developed by International Business Machines Corporation of Armonk, N.Y. defines a datastream, which may be utilized by applications to describe documents and object envelopes for document interchange and document exchange with other applications and application services. Interchange is the predictable interpretation of shared information in an environment where the characteristics of each process need not be known to all other processes. Exchange is the predictable interpretation of shared information by a family of system processes in an environment where the characteristics of each process must be known to all other processes.

A mixed object document is a collection of data objects that comprise the document's content and the resources and formatting specifications that dictate the processing functions to be performed on that content. The term "Mixed" in the Mixed Object Document Content Architecture (MO:DCA)™ refers to both the mixture of data objects and the mixture of document constructs that comprise the document's components. A Mixed Object Document Content Architecture (MO:DCA)™ document can contain a mixture of presentation objects types, which each have a unique processing requirement. The Mixed Object Document Content Architecture (MO:DCA)™ is designed to integrate the different data object types into documents that can be interchanged as a single datastream and provides the datastream structures needed to carry the data objects. The MO:DCA™ datastream also provides syntactic and semantic rules governing the use of objects to ensure different applications process objects in a consistent manner.

In its most complex form a Mixed Object Document Content Architecture (MO:DCA)™ document contains data and resource objects along with data structures which define the document's layout and composition features. This form is called a Mixed Object Document Content Architecture (MO:DCA)™ presentation document. Within such a datastream the Mixed Object Document Content Architecture (MO:DCA)™ components are defined with a syntax that consists of self-describing structures called structured fields. Structured fields are the main Mixed Object Document Content Architecture (MO:DCA)™ structures and are utilized to encode Mixed Object Document Content Architecture (MO:DCA)™ commands. A structured field starts with an introducer that uniquely identifies the command, provides a total length for the command, and specifies additional control information such as whether padding bytes are present. The introducer is then followed by data bytes. Data may be encoded within the structured field utilizing fixed parameters, repeating groups, key words, and triplets. Fixed parameters have a meaning only in the context of the structure that includes them. Repeating groups are utilized to specify grouping of parameters that can appear multiple times. Key words are self-identifying parameters that consist of a one byte unique key word identifier followed by a one byte keyword value. Triplets are self-identifying parameters that contain a length field, a unique triplet identifier, and data bytes. Key words and triplets have the same semantics wherever they are utilized. Together these structures define a syntax for Mixed Object Document Content Architecture (MO:DCA)™ datastreams which provide for orderly parsing and flexible extendibility.

The document is the highest level within the Mixed Object Document Content Architecture (MO:DCA)™ datastream document component hierarchy. Documents may be constructed of pages, and the pages, which are at the intermediate level, may be made up of data objects. Data objects are at the lowest level and can be bar code objects, graphics objects, image objects and presentation text.

Multiple documents may be collected into a print file. A print file may optionally contain, at its beginning, an "inline" resource group that contains resource objects required for print. Alternatively, the resource objects may be stored in a resource library that is accessible to the print server, or they may be resident in the printer.

A Mixed Object Document Content Architecture (MO:DCA)™ document in its presentation form is a document which has been formatted and is intended for presentation, usually on a printer or a display device. A datastream containing a presentation document should produce the same document content in the same format on different printers or display devices, dependent on the capabilities of each of the printers or display devices. A presentation document can reference resources that are to be included as part of the document to be presented, which are not present within the document as transmitted within the MO:DCA™ datastream.

Pages within the Mixed Object Document Content Architecture (MO:DCA)™ are the level within the document component hierarchy which is utilized to print or display a document's content. Each page has associated environment information that specifies page size and that identifies resources required by the page. This information is carried in a MO:DCA™ structure called an Active Environment Group (AEG). Data objects contained within each page envelope in the datastream are presented when the page is presented. Each data object has associated environment information that directs the placement and orientation of the data on the page, and that identifies resources required by the object. This information is carried in a MO:DCA™ structure called an Object Environment Group (OEG). Note that a Resource Environment Group (REG) may be included for identifying resources prior to printing. The REG is specified at the beginning of a document or job, or on any page boundary in a document or job, and identifies complex resources that are required by the pages that follow.

Delimiters that identify the object type, such as graphics, image or text, bound objects in the datastream. In general, data objects consist of data to be presented and the directives required to present it. The content of each type of data object is defined by an object architecture that specifies presentation functions, which may be utilized within its coordinate space. All data objects function as equals within the Mixed Object Document Content Architecture (MO:DCA)™ datastream environment. Data objects are carried as separate entities in the Mixed Object Document Content Architecture (MO:DCA)™ datastream.

Resource objects are named objects or named collection of objects that can be referenced from within the document. In general, referenced resources can reside in an inline resource group that precedes the document in the MO:DCA™ datastream or in an external resource library and can be referenced multiple times. Resource objects may need to be utilized in numerous places within a document or within several documents.

An object container within the Mixed Object Document Content Architecture (MO:DCA)™ is an envelope for object data that is not necessarily defined by an International Business Machines Corporation presentation architecture and that might not define all required presentation parameters. The container consists of a mandatory Begin/End structured field pair, an optional Object Environment Group (OEG) and mandatory Object Container Data (OCD) structured fields. If an object is to be carried in Mixed Object Document Content Architecture (MO:DCA)™ resource groups and interchanged, it must, at a minimum, be enveloped by a Begin/End pair. The Object Classification triplet on the Begin structured field must specify the registered object identifier (OID) for the object data format, and the data must be partitioned into OCD structured fields.

A printer datastream within a presentation architecture is a device-dependent continuous ordered stream of data elements and objects conforming to a given format, which are destined for a presentation device. The Intelligent Printer Datastream (IPDS)™ architecture developed by International Business Machines Corporation and disclosed within U.S. Pat. No. 4,651,278, which is incorporated herein by reference, defines the datastream utilized by print server programs and device drivers to manage all-points-addressable page printing on a full spectrum of devices from low-end workstation and local area network-attached printers to high-speed, high-volume page printers for production jobs, Print On Demand environments, shared printing, and mailroom applications. The same object content architectures carried in a MO:DCA™ datastream are carried in an IPDS™ datastream to be interpreted and presented by microcode executing in printer hardware. The IPDS™ architecture defines bi-directional command protocols for query, resource management, and error recovery. The IPDS™ architecture also provides interfaces for document finishing operations provided by pre-processing and post-processing devices attached to IPDS™ printers.

The IPDS™ architecture incorporates several important features. As noted above, since the IPDS™ architecture supports the same objects as those carried by the MO:DCA™ datastream, the IPDS™ architecture enables the output of multiple diverse applications to be merged at print time so that an integrated mixed-data page, including text, images, graphics, and bar code objects, results. The IPDS™ architecture transfers all data and commands through self-identifying structured fields that describe the presentation of the page and provide for dynamic management of resources, such as overlays, page segments and fonts as well as the comprehensive handling of exception conditions. Furthermore, the IPDS™ architecture provides an extensive acknowledgement protocol at the datastream level, which enables page synchronization of the host (e.g., print server) and printer processes, the exchange of query-reply information, and the return to the host of detailed exception information.

Sophisticated datastreams allow the inclusion of heterogeneous objects on a page. These objects contain data to be rendered, but the data are not described using the primary datastream of the job. They are instead described using a different standard datastream, an earlier version of the primary datastream, or a device-dependent datastream. For example, an AFP print job may contain a TIFF image object, a PostScript (P/S) Level 2 print job may contain a PostScript Level 1 EPS graphic, a PDF print file may contain a device-dependent RGB image tuned for a particular display, and so on. While it is possible to render these heterogeneous objects using their own datastreams, it is sometimes desirable to allow the primary datastream to affect the rendering of these objects, generally because the primary datastream specifies more rendering control than the objects' datastreams do.

For example, color images in PostScript Level 1 are specified only in device-dependent CMYK, and users identify which of the standard CMYK color spaces the renderer should use (such as SWOP or Euroscale) outside the PostScript Level 1 datastream, through machine settings. Thus, PostScript Level 1 renderers must assume that all CMYK images are from the same color space (all SWOP, for example, or all Euroscale), but not a mixture.

Moreover, AFP can include PostScript Level 1 color images as heterogeneous objects on an AFP page. Such objects are passed to a P/S renderer for processing. The P/S renderer can apply a different color space to each image and so could support a mixture of SWOP and Euroscale images on the page. However, the object content sent to the P/S renderer is pure PostScript Level 1 and cannot identify which color space should be applied.

Another illustration involves images that are tuned to a particular device, such as device RGB data within a PDF file. The color quality of that RGB image is only exact when the PDF file is displayed on the device it was tuned for (typically the author's monitor). When printed, the RGB representation will be converted to printer's colorants assuming some RGB calibration, which probably will not match the author's monitor, and so the printed image will have its colors shifted from the original, perhaps significantly. A sophisticated PDF renderer might be able to adjust its RGB calibration to more closely match the original, but RGB data has no way to communicate the source calibration parameters. Yet another instance of the problem involves images that are tuned to a particular halftoning algorithm.

In the example that follows, the data object is a P/S level 1 EPS object that is carried in an AFP (MO:DCA-P) datastream and that is tagged with a CMYK profile. Presentation data objects, such as P/S level 1 objects and raster image objects, that specify color using the CMYK color space, are inherently device-dependent. That is, when the CMYK is rendered on a marking engine, the resultant color is dependent on a number of printer-specific parameters such as print technology and toner/ink. On the other hand, specifying colors using CMYK is convenient since, in general, no color transformations are required to render these colors on a printer, therefore these objects tend to print fast. Before device-independent color spaces (such as CIELab) and color management systems came into use in the early 1990s most data intended for printing specified color using the CMYK color space. This is particularly true with PostScript Level 1 files.

To achieve somewhat consistent rendering of CMYK colors, a number of CMYK color standards were developed. These standards basically defined hypothetical offset presses that rendered a given CMYK value with a pre-defined color. The pre-defined colors and their associated CMYK values were then published using a large set of color swatches. Two examples of such press standards are CMYK SWOP and CMYK Euroscale.

There exists much presentation data, particularly PostScript Level 1 data, that is 'tuned' to one of these defacto standards. In the AFP presentation environment such data can be mixed with other AFP data on a page and needs to be rendered appropriately. This can be a problem since, for a given page, there may be CMYK data that is tuned to SWOP, CMYK data that is tuned to Euroscale, and CMYK data that is just tuned for the particular printer. That is, the particular CMYK flavor is an object level attribute that can be different for each object on a page.

As mentioned above, a control console has been used to select the rendering on some printers. For example, the Infoprint Color 100 PostScript printer uses an operator-controlled console switch. The clear drawback to this solution is that it assigns a specific CMYK attribute to the whole print job, not to individual objects on a page in the job. While rendering control has been described primarily using examples of color management and AFP datastreams, those skilled in the art will recognize that the present invention is not meant to be limited to only this rendering control or only this primary datastream.

It can be seen then that there is a need for a method, data structure and apparatus for providing object level management using tagged secondary resources.

It can also be seen then that there is a need for a method, data structure and apparatus that can apply the AFP color space capability (allowing a mixture of color spaces on a page) to objects (that can't distinguish different CMYK color spaces) without modifying the object content.

SUMMARY OF THE INVENTION

To overcome the limitations in the prior art described above, and to overcome other limitations that will become apparent upon reading and understanding the present specification, the present invention discloses a method, data structure and apparatus for providing object level management using tagged secondary resources.

The present invention solves the above-described problems facilitating the application of the rendering control (e.g., color space selection) of the primary datastream (e.g., AFP) to heterogeneous objects (e.g., PostScript Level 1 color images). The present invention provides a method for the primary datastream to include the source calibration parameters, i.e., the rendering control, without modifying the heterogeneous object. For example, if the threshold matrix for the halftoning is tagged as a resource to the image object, the rendering process can use this specific matrix when the image is halftoned and presented.

A data structure in accordance with the principles of the present invention is disposed in a document datastream for providing object level management using tagged secondary resources, wherein the data structure includes at least one map structured field for identifying rendering control data as a secondary resource and at least one include object reference to an object that references the rendering control data.

Other embodiments of a data structure in accordance with the principles of the invention may include alternative or optional additional aspects. One such aspect of the present invention is that a plurality of map structured fields are provided.

Another aspect of the present invention is that a plurality of include object references to an object reference mapped rendering control data.

Another aspect of the present invention is that the rendering control data comprises source calibration parameters.

Another aspect of the present invention is that the source calibration parameters comprise a color profile.

Another aspect of the present invention is that a method and article of manufacture provide object level management using tagged secondary resources is provided. The method and article of manufacture include identifying rendering control data for at least one object as a secondary resource, including at least one include structured field for the at least one object that references the identified rendering control data, printing a page containing the at least one object, the at least one object on the page being rendered according to the identified rendering control data for the at least one object.

Another aspect of the present invention is that a method and article of manufacture provide object level management for a page using tagged secondary resources. The method and article of manufacture include determining whether rendering control data for an object is identified, making the rendering control data for the object available in the printer, including the object that references the mapped rendering control data for the object, determining whether additional rendering control data is to be identified, making additional rendering control data for additional objects available in the printer and including the additional objects that reference the additionally mapped rendering control data for the additional objects. When it is determined that additional rendering control data is to be mapped, rendering objects in page according to mapped rendering control data for the objects and printing the page.

Another aspect of the present invention is that a system provides object level management for a page. The system includes a print server for receiving an application datastream defining a document containing objects for printing and creating a printer datastream that is specific to a destination printer engine in order to integrate with the printer's specific capabilities and command set and a control unit for maintaining cached objects, the control unit further comprising a raster image processor for rendering object according to commands provided by the print server in the printer datastream, wherein the print server identifies at least one set of rendering control data as a secondary resource and includes at least one object that references the at least one mapped set of rendering control data based upon a data structure in the application datastream that tags rendering control data to objects.

These and various other advantages and features of novelty which characterize the invention are pointed out with particularity in the claims annexed hereto and form a part hereof. However, for a better understanding of the invention, its advantages, and the objects obtained by its use, reference should be made to the drawings which form a further part hereof, and to accompanying descriptive matter, in which there are illustrated and described specific examples of an apparatus in accordance with the invention.

BRIEF DESCRIPTION OF THE DRAWINGS

Referring now to the drawings in which like reference numbers represent corresponding parts throughout:

FIG. 3 illustrates the structures used in a MO:DCA datastream to identify a color profile as a secondary resource and to tag it to the reference to an EPS object according to the present invention;

DETAILED DESCRIPTION OF THE INVENTION

In the following description of the exemplary embodiment, reference is made to the accompanying drawings which form a part hereof, and in which is shown by way of illustration the specific embodiment in which the invention may be practiced. It is to be understood that other embodiments may be utilized and structural changes may be made without departing from the scope of the present invention.

The present invention provides a method, data structure and apparatus for providing object level management using tagged (i.e., formally associated) secondary resources. A secondary resources is a resource associated with an object that may itself be processed as a resource. Rendering control (color space selection, in this case) of the primary datastream (AFP, in this case) to heterogeneous objects (PostScript Level1 color images, in this case) is provided. The present invention provides a method for the primary datastream to include the source calibration parameters, i.e., the rendering control, without modifying the heterogeneous object. For example, if the threshold matrix for the halftoning is tagged as a resource to the image object, the rendering process can use this specific matrix when the image is halftoned and presented.

Figure 1:
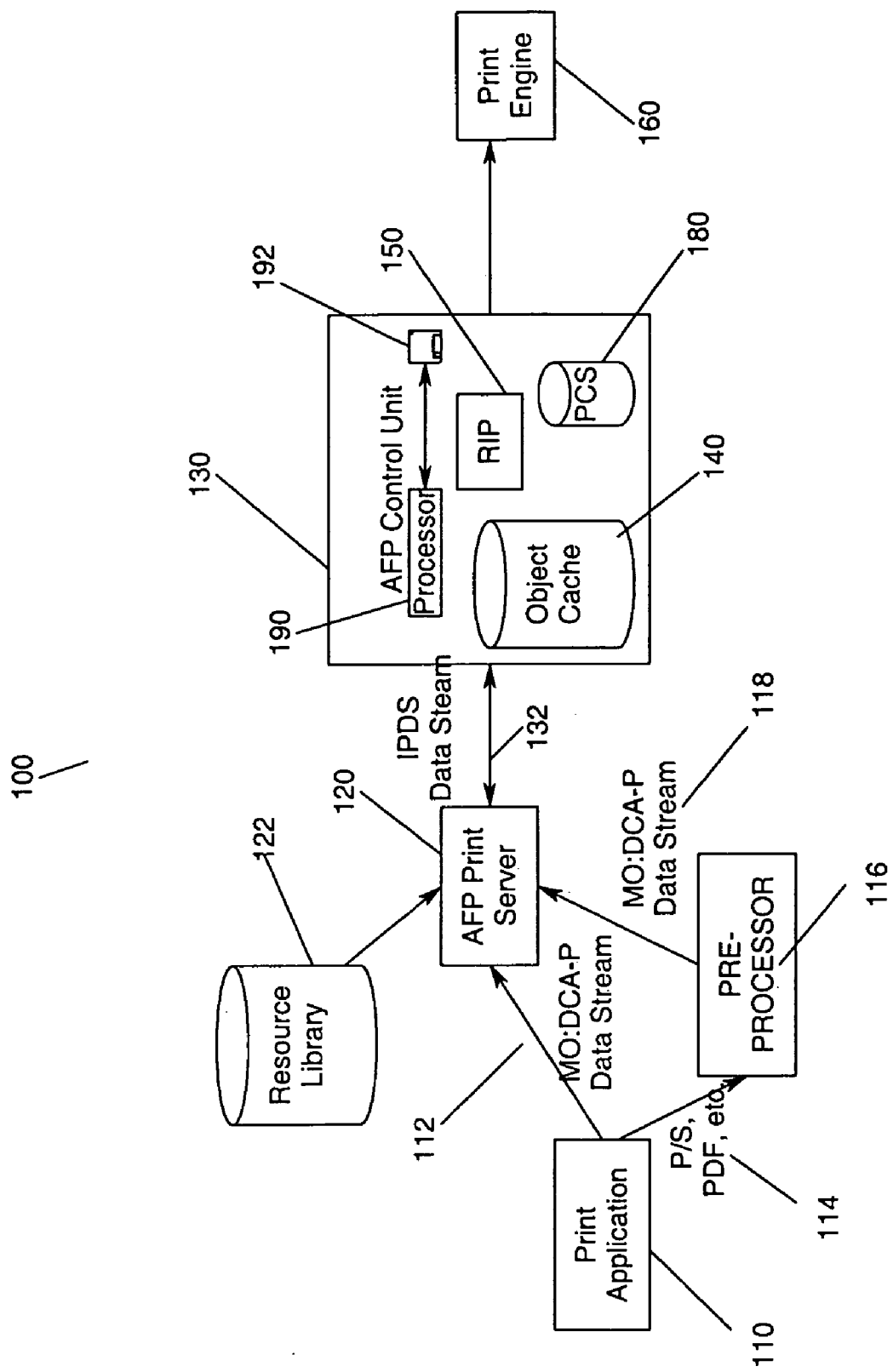
FIG. 1 illustrates an Advanced Function Presentation (AFP™) printing system according to the present invention.

FIG. 1 illustrates an Advanced Function Presentation (AFP) printing system 100 according to the present invention. In FIG. 1, a print application 110 makes a request for the printing of a document. The print application 110 provides a Mixed Object Document Content Architecture (MO:DCA)™ datastream 112 to the AFP print server 120, also called the Print Service Facility (PSF™) or Infoprint Manager.

The print application 110 may also provide PostScript (P/S) and PDF files 114 for printing. PostScript (P/S) and PDF files 114 are printed by first passing them through a pre-processor 116. The pre-processor 116 creates resource separation and page independence so that the P/S or PDF file can be transformed into an AFP (MO:DCA)™ datastream 118, which is then passed to the AFP print server 120.

The AFP (MO:DCA)™ datastreams 112, 118 are object-oriented streams consisting of, among other things, data objects, page objects, and resource objects. The pre-processor 116 creates simplified, sequential P/S or PDF page objects that preserve the graphics page content, and resource objects that are required to print the page content. These objects are then wrapped into the appropriate AFP structures and embedded in an AFP print file. In accordance with this invention, the pre-processor filters out or 'sidelines' complex, multi-use resources and builds a AFP (MO:DCA)™ datastream 118 according to the present invention.

It will be obvious to a person skilled in the art that the same type of pre-processing can be applied to arbitrary input data streams, such as a multi-page Tag Image File Format (TIFF) file. It can also be applied to compound jobs consisting of multiple file formats.

AFP (MO:DCA)™ datastreams 112, 118, according to the present invention, may contain a resource-identification structure that is specified at the beginning of the AFP document, before the first page. When the AFP (MO:DCA)™ datastreams 112, 118 are processed by an AFP print server 120, the resource structure is encountered first and causes the server to download any of the identified resources that are not already present in the printer. This occurs before paper is moved for the first page of the job. When the pages that require the complex resources are eventually processed, no additional download time is incurred for these resources.

The resource library 122 provides objects to the AFP print server 120. The AFP (MO:DCA)™ datastreams 112, 118 are provided according to a device-independent page description language (PDL). The AFP print server 120 processes pages of output that mix all of the elements normally found in presentation documents, e.g., text in typographic fonts, electronic forms, graphics, image, lines, boxes, and bar codes. The AFP (MO:DCA)™ datastream is composed of architected, structured fields that describe each of these elements.

The AFP print server 120 communicates with an AFP control unit 130 via an Intelligent Printer Datastream (IPDS™) 132. The IPDS™ datastream 132 is similar to the AFP data steam, but is built specific to the destination printer in order to integrate with each printer's specific capabilities and command set, and to facilitate the interactive dialog between the PSF and the printer. The IPDS™ datastream 132 may be built dynamically at presentation time, i.e., on-the-fly in real time. Thus, the IPDS™ datastream is provided according to a device-dependent bi-directional command/datastream.

The AFP control unit 130 includes a cache 140 for maintaining cached objects and a raster image processor 150. AFP files are converted into IPDS™ by the AFP print server 120, and P/S or PDF page objects are rendered by the RIP 150. The AFP control unit 130 provides sheet maps for printing to a print engine 160. Objects are captured and stored in the printer capture storage (PCS) 180. The AFP control unit 130 may include a processor 190 that may be configured by program storage medium 192. The medium tangibly embodies one or more programs of instructions executable by the processor to perform the methods illustrated with reference to FIGS. 3 through 5 below. Those skilled in the art will recognize that a processor 190 may reside in the AFP print server 120 or may be coupled to both the AFP print server 120 and the AFP control unit 130.

To optimize the management of complex resources AFP architecture extensions are used. In this manner, complex objects can be treated as resources that are downloaded once and can be re-used multiple times by multiple documents and print servers. Resources can be assigned globally-unique identifiers that are platform-independent. This allows datastreams to be created that are platform-independent and that guarantee the integrity of object identification. Multi-use resources can be captured in the printer and maintained across PSF sessions and printer power cycles. Further, a captured object can be re-used at a different position, clipping, orientation, and size.

To identify objects, objects are assigned unique identifiers called Object Identifiers (OIDs). In a MO:DCA™ (AFP) datastream, OIDs are carried in syntax structures called Fully Qualified Name (FQN) triplets, which are used to reference and identify objects. U.S. Pat. No. 5,813,020, issued Sep. 22, 1998, to Hohensee et al., and which is assigned to International Business Machines Corporation, Armonk, N.Y., and which is incorporated herein by reference, discloses a method and system for managing a presentation datastream which includes an ordered stream of uniquely identified data objects and associated elements which specify format and presentation parameters for those data objects for utilization within a specified application. For example, an OID may be represented using a syntax within structured fields that is based on the ISO Basic Encoding Rules and is defined in ISO/IEC 8825:1990(E).

Figure 2:
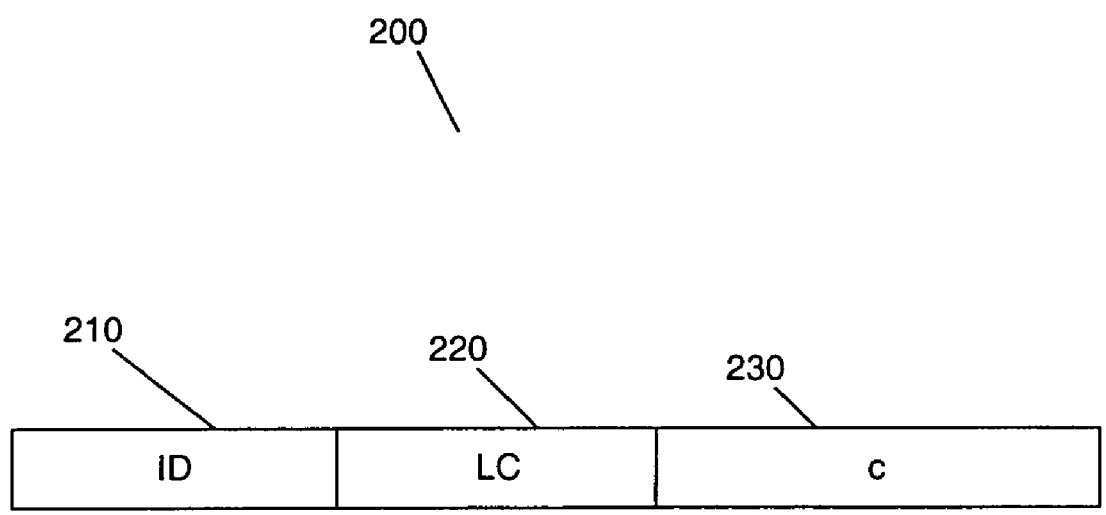
FIG. 2 illustrates one embodiment of an OID.

FIG. 2 illustrates one embodiment of an OID 200. The OID includes the identifier byte 210, the length of content byte 220 and the content 230. However, those skilled in the art will recognize that the present invention is not meant to be limited to the particular syntax illustrated in FIG. 2. Rather, the syntax structure shown in FIG. 2 is merely one example of a syntax structure for an OID.

High-speed color printing is enabled by managing complex resources in a way that ensures resources are present in the device when they are required by an AFP page. Two conceptual methods are provided in a printer for holding downloaded resources: caching and capturing. Whenever a resource is downloaded from the print server to the printer, it is cached. This means that the resource is available in the printer for the duration of the job, but probably no longer than that. In addition, cached resources are deleted when the server session ends, and when the printer is powered down or re-started.

Capturing overcomes the temporary nature of caching. Once an object is captured, it becomes a resident resource in the printer and lasts across server sessions and printer power-off cycles. Resources may be captured by the printer if the resource is made capturable and if the printer has sufficient storage to save the resources. The print server 120 or the control unit 130 may delete such resources (based on a scheme such as a least recently used (LRU) basis) if the storage allocated for capturing is full and the current set of captured resources are not all deemed to be in active usage. However, those skilled in the art will recognize that objects in memory may be deleted according to several criteria, including deleting non-active, least-recently used objects first, deleting the largest objects first or deleting the smallest objects first, so that the capture memory is most effectively utilized. The printer operator may also be given some control over deleting captured resources.

The print server (PSF) manages resource objects. This includes querying the printer to see if the object is already captured, downloading the object if not, and deleting the object at the end of the print job. This allows the object, once downloaded, to be invoked multiple times, with different presentation semantics, without requiring another download.

Management of resources is triggered by the presence of a Map Data Resource (MDR) structured field in the MO:DCA™ (AFP) datastream. To uniquely identity resources which may be shared, captured or otherwise processed by the PSF, the present invention incorporates Object Identifiers (OIDs) as described above. An OID, as defined by the ISO naming conventions, will be unique for each resource or version of particular resource.

For purposes of illustration, the present invention will be described herein in terms of CMYK color space identification in the AFP datastream. However, those skilled in the art will recognize that the present invention is not meant to be limited to only this rendering control or only this primary datastream.

The present invention uses the concept of tagging a data object with a resource. If the data object itself is a resource, that is, if it is identified or "mapped" in an environment group and then included on the page using a reference, the resource that is tagged to (i.e., formally associated with) the data object is called a "secondary resource." The secondary resource modifies the rendering process that is used to present the data object. For example, to render the color for a CMYK object correctly, the present invention defines a method for "tagging" a CMYK object with a color attribute. The method uses the concept of a color profile to carry the necessary color information. For example, a CMYK SWOP color profile contains the information (normally in the form of a look-up table) needed to convert CMYK SWOP colors back to a device-independent color space like CIELab. With that information, an AFP color printer can then transform the CMYK to CIELab, and then use its device color profile to transform the CIELab to printer-specific CMYK.

The tagging of profile to object is achieved in the present invention using the concept of a secondary resource, which is a resource attached to and required by a data object (which may itself be a resource). This secondary resource is identified, or "mapped", in the environment group for the page that contains the data object. The mapping invokes PSF resource management and causes the secondary resource to be downloaded to the printer if not already available to the printer. When a data object that requires a (color profile) secondary resource is included in the print stream, the "include" structured field contains a pointer to the secondary resource, and an object type identifier that identifies the secondary resource to be a color profile.

Since resources can be resident if they are identified with unique Object Identifiers (OIDs), standard color profiles like CMYK SWOP and CMYK Euroscale may be assigned fixed OIDs and shipped with the printer. In this manner, they will not require a resource download when identified as a secondary resource on a data object.

FIG. 3 illustrates the structures 300 used in a MO:DCA datastream to identify a color profile as a resource and to tag it to an EPS object according to the present invention. More specifically, it shows a Map Data Resource (MDR) structured field 310, specified in the page Active Environment Group (AEG), that references the CMYK SWOP profile 312 (and causes it to be managed as a resource by the PSF), and then in the page data an Include Object (IOB) structured field 350 to an EPS resource object 352 that references the color profile 312 as a secondary resource 360. Note that since the EPS object 352 does not explicitly reference the color profile from within, there is no triplet specified on the IOB 350 to map internal reference to reference 360. The tie between object and profile is implicit and must be resolved by the code in the AFP control unit 130 that interfaces to the P/S RIP 150 (as shown in FIG. 1).

The Fully Qualified Name (FQN) triplet uses the FQN type X"DE" 320 to identify (map) the color profile 322 (secondary resource) required to render the EPS data object 352. The EPS data object 352 is later included with an Include Object (IOB) 350. Whenever an object, such as the EPS object 352, that is included with an IOB 350 requires a resource that has previously been mapped, an identification for that resource 360 must be made on the IOB. For resources that are not explicitly invoked from within the data object, this identification is specified using a single FQN "DE" triplet 360 that identifies the resource to the presentation system.

The FQN "DE" triplet 320 references the color profile using a universally unique OID 322. Preferably, this OID format will only be used for complex, re-usable resources that are potentially resident in the device. In fact, the presence of this OID format on the Map Data Resource (MDR) 310 is the trigger that tells the AFP print server that the corresponding object, i.e., the color profile 322, may already be resident in the device, and if not, could be captured by the device. When this format is used to map a resource, the object itself must be carried in a valid MO:DCA™ container structure and must specify the same OID on the Begin structured field. The Object Classification triplet (X"10") 330 specifies the OID 332 that defines the type of object (color profile) being referenced, and is mandatory.

The IOB 350 includes the EPS data object on the page. This object could have previously been mapped with an MDR, in which case PSF resource management would have been invoked to ensure that the object is available in the printer. The IOB references the object using an 8 byte name, which is overridden with an FQN type X"01" triplet 370 that can carry a longer name (up to 250 bytes). The object classification (X"10") triplet 380 specifies the OID that defines the type of object (EPS object) being included. Note that the OID mechanism is used (1) to identify an object type (using a fixed registry), and (2) to identify a specific instance of an object of a specified object type (using an application-specific OID generation). These mechanisms are thus used to tie a device color profile 312 (CMYK SWOP OID) to an EPS object 352.

Figure 4:
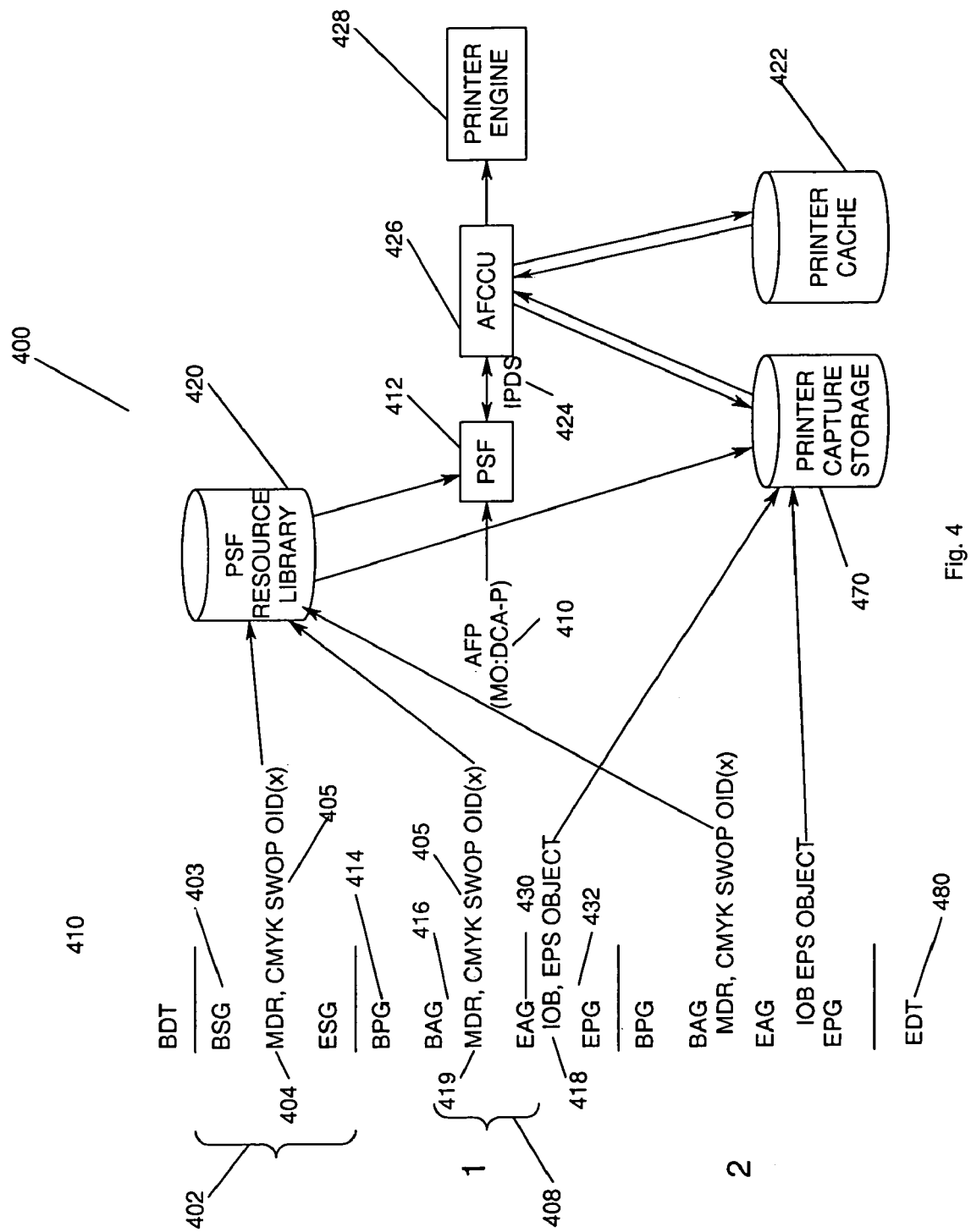
FIG. 4 illustrates operation of the printer using the data structure for providing object level management using tagged secondary resources according to the present invention.

FIG. 4 illustrates operation of the printer 400 using the data structure for providing object level management using tagged secondary resources according to the present invention. In FIG. 4, the PSF 412 receives an AFP (MO:DCA)™ datastream 410 from a print application. The PSF 412 is provided images from the PSF resource library 420, which can be sent to the printer cache 422 or the printer capture storage 470 using the IPDS™ 424. The PSF 412 uses the Intelligent Printer Datastream (IPDS™) printer protocol 424 to take full advantage of the advanced printer capabilities. The PSF 412 and the Advanced Function Common Control Unit (AFCCU) 426 (also referred to as the AFP control unit) communicate via the IPDS™ 424 to control the printer engine 428.

In FIG. 4, the AFP (MO:DCA)™ datastream 410 includes a Resource Environment Group (REG) 402. The REG 402 is defined by the Begin Resource Environment Group (BSG) structured field 403 that indicates the start of the REG 402. The REG 402 in FIG. 4 includes one Map Data Resource (MDR) structured field 404. The MDR 404 references the CMYK SWOP profile 405 and causes it to be managed as a resource by the PSF. The CMYK SWOP profile 405 from the PSF resource library is downloaded and captured in the printer capture storage 470, or it may be shipped resident with the printer, or it may just be cached in the printer cache 422. The AFCCU 426 may access the CMYK SWOP profile 405, whether it is captured 470 or cached 422.

BPG 414 signals the beginning of a page, BAG 416 signals the beginning of the Active Environment Group (AEG) 408 for the first page, and IOB 418 signals the inclusion of an object. The MDR 404 in the REG is repeated as MDR 419 in the AEG. Resources required for a page must be mapped in the AEG for the page and may optionally be mapped in an REG ahead of the page. FIG. 4 illustrates the document having two pages (1 and 2). The IOB structured field 418 to the EPS object references the CMYK SWOP profile 405 as a secondary resource. EAG 430 signals the end of the Active Environment Group, EPG 432 signals the end of a page and EDT 480 signals the end of the document. Thus, the AFP datastream defines a document having two pages (1 and 2). Each page includes an EPS object using an Include Object (IOB) structured field 418. The IOB structured field 418 also references the CMYK SWOP OID(x) 405, which, if not shipped resident in the printer, was captured in the printer capture storage 470, or cached in the printer cache 422 during the processing of the REG 402. Thus, both pages may be printed without waiting for the CMYK SWOP profile 405 to be downloaded. Note that a new REG (not shown) may be provided between pages, e.g., between pages 1 and 2.

Figure 5:
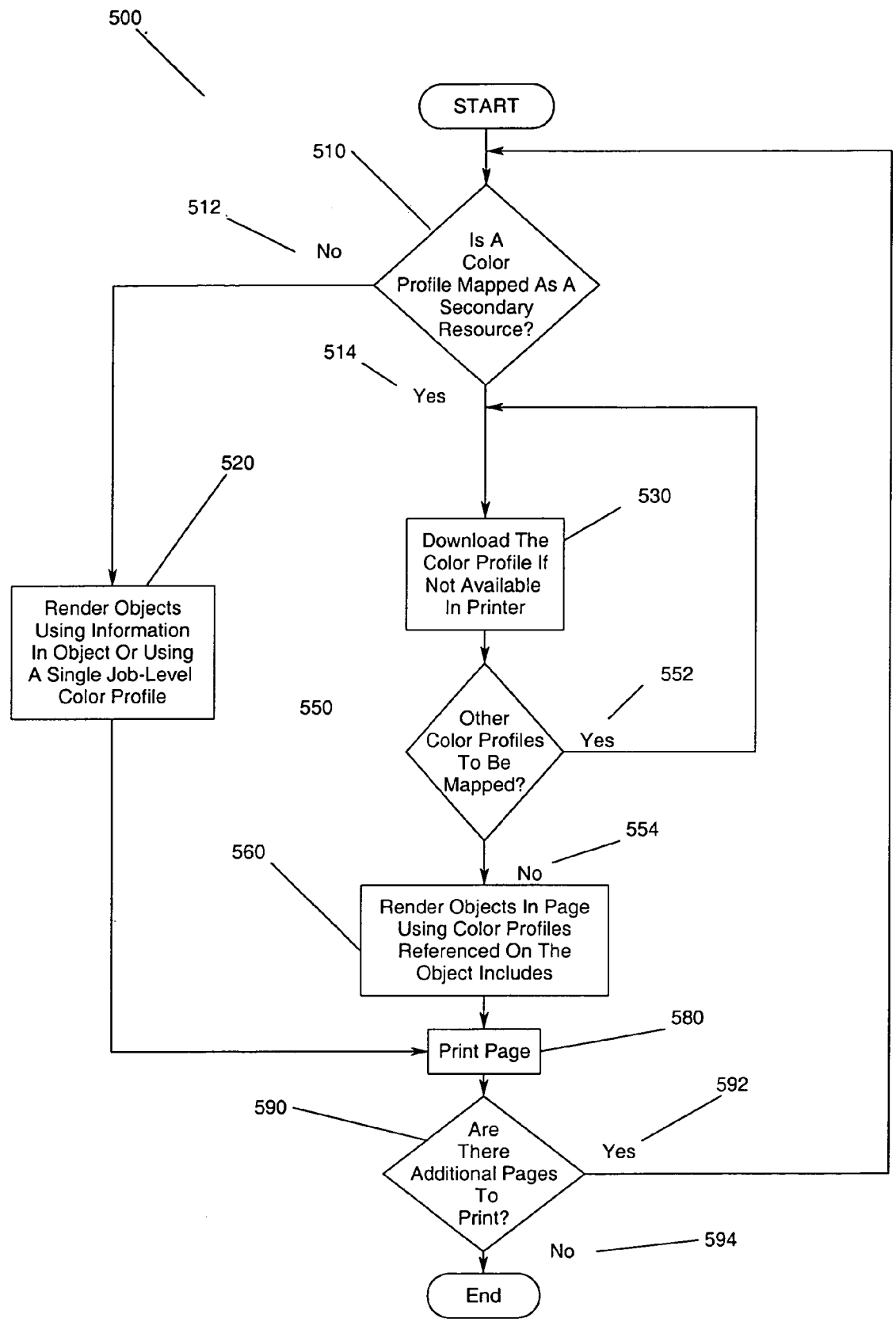
FIG. 5 illustrates a flow chart of the method for providing object level management using tagged secondary resources according to the present invention.

FIG. 5 illustrates a flow chart 500 of the method for providing object level management using tagged secondary resources according to the present invention. In FIG. 5, the print server determines whether a color profile is mapped 510. If a color profile is not mapped 512, objects are rendered using only the information in the object, or using a single job-level color profile 520. Then, the pages are printed 580. If a color profile is mapped 514, the print server downloads the color profile if it is not already available in the printer 530. Next, the print server determines whether there are other color profiles to be mapped 550. If there are 552, they too are downloaded, if necessary 530. If not 554, objects in the page are rendered using the color profiles referenced on the Object Includes 560 and the page is printed 580. The print server checks to determine whether there are other pages to print 590. If there are 592, the process is repeated. If not 594, the process for the print job is terminated.

Accordingly, the present invention allows data objects to be tagged with secondary resources that specify rendering attributes, such as color profiles. More specifically, it allows individual CMYK objects to be tagged with a color profile that defines the CMYK "flavor." While prior solutions address this problem at the job level, they are insufficient for environments where different object types can be mixed on the same page.

The foregoing description of the exemplary embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

What is claimed is:

1. A data structure embodied in a tangible computer readable medium for providing object level management of a document datastream in a print system using tagged secondary resources, the data structure comprising:
a mixed object document structure, wherein the mixed object document structure further comprising:
a mapping structure; and
a page layout structure;
wherein the mapping structure includes at least one mapping reference identifying a set of rendering control data as a secondary resource, and wherein the page layout structure includes an include object structure, the include object structure signaling inclusion of an object identifying rendering control data mapped in the mapping structure for use in rendering the object.

2. The data structure of claim 1 wherein a plurality of mapping structures are provided.

3. The data structure of claim 2 wherein a plurality of include object structures to an object reference the identified rendering control data.

4. The data structure of claim 1 wherein a plurality of include object structures to an object are provided for referencing identified rendering control data.

5. The data structure of claim 1 wherein the rendering control data comprises source calibration parameters.

6. The data structure of claim 5 wherein the source calibration parameters comprise a color profile.

7. The data structure of claim 5 wherein the source calibration parameters comprise halftoning parameters.

8. The data structure of claim 1 wherein the rendering control data comprises text rendering parameters.

9. The data structure of claim 1 wherein the rendering control data comprises vector graphic rendering parameters.

10. The data structure of claim 1 wherein the rendering control data comprises image rendering parameters.

11. A method for providing object level management using tagged secondary resources, comprising:
  generating a mapping structure that includes at least one mapping reference identifying a set of rendering control data as a secondary resource; and
  generating a page layout structure that includes at least one include object structure, the at least one include object structure signaling inclusion of an object identifying rendering control data mapped in the mapping structure for use in rendering the object; and
  printing a page according to the at least one include object structure, at least one object on the page being rendered according to mapped rendering control data identified by the at least one object.

12. The method of claim 11 wherein the rendering control data comprises source calibration parameters.

13. The method of claim 12 wherein the source calibration parameters comprise a color profile.

14. The method of claim 12 wherein the source calibration parameters comprise halftoning parameters.

15. The method of claim 11 wherein the rendering control data comprises text rendering parameters.

16. The method of claim 11 wherein the rendering control data comprises vector graphic rendering parameters.

17. The method of claim 11 wherein the rendering control data comprises image rendering parameters.

18. A method for providing object level management for a page using tagged secondary resources, comprising:
  determining whether a document datastream includes a mapping structure comprising at least one mapping reference identifying a set of rendering control data as a secondary resource; and
  obtaining rendering control data identified by the at least one mapping reference for access by the printer;
  preparing a document for printing according to a page layout structure that includes at least one include object structure the at least one include object structure signaling inclusion of an object identifying rendering control data mapped in the mapping structure for use in rendering the object; and
  printing a page according to the at least one include object structure, at least one object on the page being rendered according to mapped rendering control data identified by the at least one object.

19. The method of claim 18 wherein the rendering control data comprises source calibration parameters.

20. The method of claim 19 wherein the source calibration parameters comprise a color profile.

21. The method of claim 19 wherein the source calibration parameters comprise halftoning parameters.

22. The method of claim 18 wherein the rendering control data comprises text rendering parameters.

23. The method of claim 18 wherein the rendering control data comprises vector graphic rendering parameters.

24. The method of claim 18 wherein the rendering control data comprises image rendering parameters.

25. A system for providing object level management for a page, comprising:
  a print server for receiving an application datastream defining a document containing objects for printing and creating a printer datastream that is specific to a destination printer engine in order to integrate with the printer's specific capabilities and command set; and
  a control unit for maintaining cached objects, the control unit further comprising a raster image processor for rendering object according to commands provided by the print server in the printer datastream;
  wherein the application datastream comprises a mixed object document structure, wherein the mixed object document structure further comprising:
    a mapping structure; and
    a page layout structure;
    wherein the mapping structure includes at least one mapping-reference identifying a set of rendering control data as a secondary resource and wherein the page layout structure includes an include object structure, the include object structure signaling inclusion of an object identifying rendering control data mapped in the mapping structure for use in rendering the object.

26. The system of claim 25 wherein the secondary resource is shipped resident in the printer.

27. The system of claim 25 wherein the secondary resource is downloaded by the print server based upon the mapping when the secondary resource is not resident.

28. The system of claim 25 wherein the rendering control data comprises source calibration parameters.

29. The system of claim 28 wherein the source calibration parameters comprise a color profile.

30. The system of claim 28 wherein the source calibration parameters comprise halftoning parameters.

31. The system of claim 25 wherein the rendering control data comprises text rendering parameters.

32. The system of claim 25 wherein the rendering control data comprises vector graphic rendering parameters.

33. The system of claim 25 wherein the rendering control data comprises image rendering parameters.

34. An article of manufacture comprising a program storage medium readable by a computer, the medium tangibly embodying one or more programs of instructions executable by the computer to perform a method for providing object level management for a page, the method comprising:
  generating a mapping structure that includes at least one mapping reference identifying a set of rendering control data as a secondary resource; and
  generating a page layout structure that includes at least one include object structure, the at least one include object structure signaling inclusion of an object identifying rendering control data mapped in the mapping structure for use in rendering the object; and
  printing a page according to the at least one include object structure, at least one object on the page being rendered according to mapped rendering control data identified by the at least one object.

35. The article of manufacture of claim 34 wherein the rendering control data comprises source calibration parameters.

36. The article of manufacture of claim 35 wherein the source calibration parameters comprise a color profile.

37. The article of manufacture of claim 35 wherein the source calibration parameters comprise halftoning parameters.

38. The article of manufacture of claim 34 wherein the rendering control data comprises text rendering parameters.

39. The article of manufacture of claim 34 wherein the rendering control data comprises vector graphic rendering parameters.

40. The article of manufacture of claim 34 wherein the rendering control data comprises image rendering parameters.

41. An article of manufacture comprising a program storage medium readable by a computer, the medium tangibly embodying one or more programs of instructions executable by the computer to perform a method for providing object level management for a page, the method comprising:

determining whether a document datastream includes a mapping structure comprising at least one mapping reference identifying a set of rendering control data as a secondary resource; and obtaining rendering control data identified by the at least one mapping reference for access by the printer;

preparing a document for printing according to a page layout structure that includes at least one include object structure, the at least one include object structure signaling inclusion of an object identifying rendering control data mapped in the mapping structure for use in rendering the object; and printing a page according to the at least one include object structure, at least one object on the page being rendered according to mapped rendering control data identified by the at least one object.

42. The article of manufacture of claim 41 wherein the rendering control data comprises source calibration parameters.

43. The article of manufacture of claim 42 wherein the source calibration parameters comprise a color profile.

44. The article of manufacture of claim 42 wherein the source calibration parameters comprise halftoning parameters.

45. The article of manufacture of claim 41 wherein the rendering control data comprises text rendering parameters.

46. The article of manufacture of claim 41 wherein the rendering control data comprises vector graphic rendering parameters.

47. The article of manufacture of claim 41 wherein the rendering control data comprises image rendering parameters.

* * * * *